United States Patent [19]

Lipps et al.

[11] Patent Number: 5,062,583
[45] Date of Patent: Nov. 5, 1991

[54] HIGH ACCURACY BANK-TO-TURN AUTOPILOT

[75] Inventors: Gary D. Lipps; Stephen D. Wood, both of Orlando, Fla.

[73] Assignee: Martin Marietta Corporation, Bethesda, Md.

[21] Appl. No.: 480,976

[22] Filed: Feb. 16, 1990

[51] Int. Cl.[5] .................... F41G 7/20; G06F 15/50
[52] U.S. Cl. .................... 244/3.15; 364/434; 364/435; 364/433
[58] Field of Search .................... 364/433, 434, 435; 244/3.16, 3.15, 3.20, 3.21

[56] References Cited

U.S. PATENT DOCUMENTS

| | | | |
|---|---|---|---|
| 3,741,500 | 6/1973 | Liden | 244/3.2 |
| 4,044,237 | 8/1977 | Cowgill et al. | 244/3.15 |
| 4,123,019 | 10/1978 | Amberntson | 244/3.2 |
| 4,173,785 | 11/1979 | Licata | 244/3.2 |
| 4,234,142 | 11/1980 | Yost et al. | 244/3.21 |
| 4,381,090 | 4/1983 | Garner | 244/3.16 |
| 4,396,878 | 8/1983 | Cole et al. | 244/3.15 |
| 4,511,972 | 4/1985 | Hofman et al. | 364/434 |
| 4,530,476 | 7/1985 | Thurber, Jr. et al. | 244/3.21 |
| 4,590,567 | 5/1986 | Hofman et al. | 364/434 |
| 4,750,688 | 6/1988 | Davies | 244/3.15 |

Primary Examiner—Salvatore Cangialosi
Attorney, Agent, or Firm—Burns, Doane, Swecker & Mathis

[57] ABSTRACT

In a bank-to-turn autopilot, increased accuracy and insensitivity to tracking noise and glint are achieved by using a yaw LOS rate to drive the roll rate loop and by sending only a body coordinate pitch LOS rate to a pitch channel so as to not introduce errors in the cross plane. By uncoupling the pitch and roll loops, pitch/yaw/roll coupling, large roll transients, and cross plane maneuvers can be minimized. Additionally, body LOS rates are transformed to inertial LOS rates and subsequently back to body LOS rates such that guidance filtering may be performed in a non-rolling frame of reference. This allows the guidance filtering to be separately optimized without regard to destabilizing effects of such filtering due to roll-to-yaw coupling path lags. In other words, servo dynamic path lags are reduced since the guidance filters do not have to track the high frequency roll rates. They only need to process a slowly varying inertial pitch and yaw rates which are then mathematically resolved back to body coordinates. Thus heavier filtering may be performed by the guidance filters while maintaining the same phase margin obtainable using simpler guidance filters in a rolling reference frame. Finally, a minimum-roll implementation is obtained by correcting the sign of the roll rate command with the pitch acceleration command. Roll is thereby constrained within ±90° as opposed to ±180° otherwise.

13 Claims, 2 Drawing Sheets

HIGH ACCURACY BANK-TO-TURN AUTOPILOT

BACKGROUND OF THE INVENTION

This invention relates to guided weapon control systems and more particularly to a guidance steering law for such systems which implements proportional navigational guidance with high accuracy using a bank-to-turn autopilot.

Guided weapons have typically been of cruciform configuration having wing surfaces spaced 90° apart. Although such a configuration is well known as are corresponding control methods, the configuration is not most advantageous from a packaging point of view. Especially when range requirements dictate that the wings be large, a cruciform configuration becomes quite unwieldy.

An alternative to the cruciform configuration is a two-wing configuration with both wings lying in a single plane. Such a configuration allows the wings to be made collapsible, so that they may be contained in a very compact convenient package. Whereas a cruciform configuration provides for control of the guided weapon trajectory in both pitch and yaw, a two-wing configuration provides control in only pitch, control in yaw being realized according to the so-called bank-to-turn (BTT) method.

In guided weapon control systems using a proportional navigational guidance (PNG) loop, pitch and yaw line-of-sight (LOS) rates from the guided weapon to a target are continuously measured and control steps taken in order to "null" the line of sight rates, or drive them to zero. The line-of-sight may be imagined as being represented by an elastic strand stretched between the guided weapon and the target. Relative motion between the guided weapon and the target that moves the elastic strand up, down, left or right produces a non-zero line-of-sight rate that generates a corrective control action proportional to that line-of-sight rate. Simple contraction of the elastic strand with diminishing distance between the guided weapon and the target represents that the guided weapon is on a collision course and does not generate any corrective control action. In the bank-to-turn method, the body coordinates of the guided weapon are rotated with respect to inertial coordinates by means of a roll maneuver such that the line-of-sight (LOS) rate with respect to the target lies entirely in pitch.

Typical bank-to-turn autopilots have been comparatively slow and imprecise. If roll and pitch maneuvers are executed simultaneously there will be some movement in the plane perpendicular to the desired plane. If the pitch maneuver is delayed until the roll maneuver is completed, the execution time of the overall maneuver is protracted.

Furthermore, typical bank-to-turn autopilots have been highly susceptible to the effects of tracking noise and glint. Glint refers to variation of the apparent radar center of a target due to angular motion causing differential phase changes at the receiver between the returns scattered from different parts of the target. Glint may be considered as a very low frequency source of noise originating at the target. Tracking noise, or "angular noise", refers to the effect of ever-present thermal noise as it is picked up and amplified by the angle channel receiver of a radar system. Tracking noise may be considered as a source of "white", or frequency independent, noise originating at the target.

An object of the present invention, therefore, is to achieve an improved bank-to-turn autopilot.

A further object of the present invention is to achieve a bank-to-turn autopilot that demonstrates high accuracy.

Still another object of the present invention is to achieve a bank-to-turn autopilot demonstrating high accuracy in the presence of tracking noise and glint.

Another object of the present invention is to achieve a bank-to-turn autopilot demonstrating relatively quick response.

SUMMARY OF THE PRESENT INVENTION

The foregoing objects and advantages of the bank-to-turn autopilot of the present invention are achieved by determining a line-of-sight rate between a guided weapon and a target and coupling only a yaw rate portion of the line-of-sight rate to a roll command channel. More particularly, a yaw LOS rate is used to drive the roll rate loop and only a body coordinate pitch LOS rate is sent to a pitch channel so as not to introduce errors in the cross plane. By uncoupling the pitch and roll loops, pitch/yaw/roll coupling, large roll transients, and cross plane maneuvers can be minimized. Additionally, body LOS rates are transformed to inertial LOS rates and subsequently back to body LOS rates such that guidance filtering may be performed in a non-rolling reference frame. This allows the guidance filtering to be separately optimized without regard to destabilizing effects of such filtering due to roll-to-yaw coupling path lags. In other words, servo dynamic path lags are reduced since the guidance filters do not have to track the high frequency roll rates but instead only need to process slowly varying inertial pitch and yaw rates which are then mathematically resolved back to body coordinates. Thus more complex, higher-order filtering may be performed by the guidance filters while maintaining the same phase margin obtainable using simpler guidance filters in a rolling reference frame. Finally, a minimum-roll implementation is obtained by correcting the sign of the roll rate command with the pitch acceleration command. Roll is thereby constrained within ±90° as opposed to ±180° otherwise.

DETAILED DESCRIPTION OF THE PREFERRED EMBODIMENT

Figure 1:
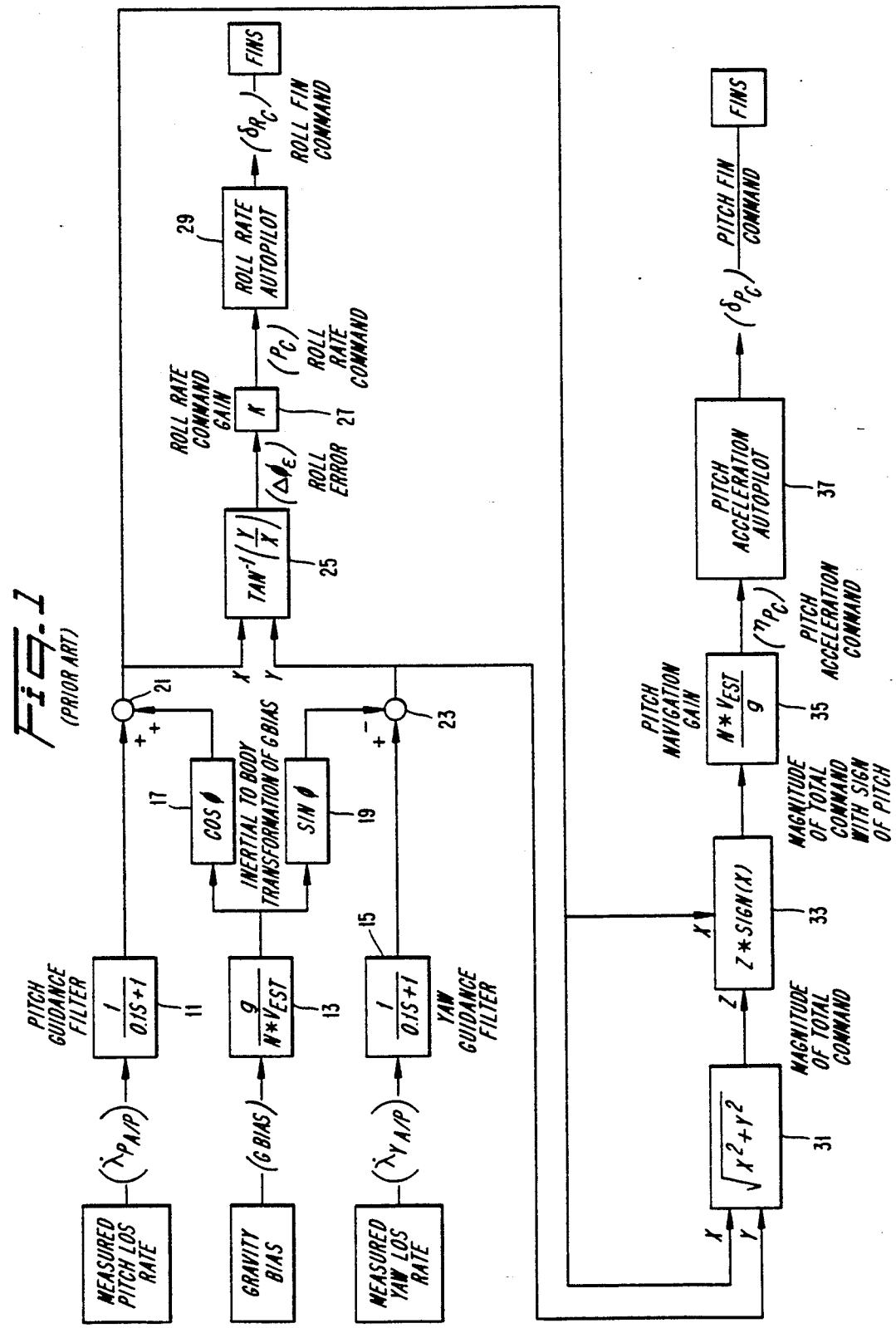
FIG. 1 is a block diagram illustrating the guidance steering law for one proposed bank-to-turn autopilot.

In order to better appreciate the advantages of the present invention, one proposed bank-to-turn autopilot will first be described with reference to FIG. 1. Inputs to the autopilot include measured pitch and yaw LOS rates obtained from rate gyros or other suitable means and a gravity bias input to compensate for the inertially downward pull of the earth. Guidance filtering of the LOS rates is performed in blocks 11 and 15 in a manner well-known in the art to minimize the effects of noise and glint. The gravity bias factor is first multiplied by a conventional gain block 13 and then transformed from inertial coordinates to freely-rolling body coordinates using sines and cosines in blocks 17 and 19. Gravity bias arrangements of this type are well-known to those of ordinary skill in the art. Gravity bias is applied to the filtered LOS rates at summing junctions 21 and 23, the resulting LOS rates being coupled to a pitch (vertical) channel X and a yaw (horizontal) channel Y.

A roll error $\Delta\phi_\epsilon$ is computed as the arctangent of the ratio of yaw to pitch (Y/X) in block 25 and is multiplied by a gain factor K in block 27 to arrive at a roll rate command $P_c$. The roll rate command is an input to a conventional roll rate autopilot 29 to arrive at a roll fin command $\delta R_c$. To arrive at a pitch fin command $\delta P_c$, the magnitude Z of the vector sum of X and Y is first computed in block 31 and then multiplied by the sign of X to give the magnitude and direction (up/down) of the total pitch command. This quantity is then amplified by a pitch navigation gain factor in block 35 to arrive at a pitch acceleration command $\eta P_c$. The pitch acceleration command is then input to a conventional acceleration autopilot 37 to arrive at pitch fin command $\delta P_c$.

As previously described, in the bank-to-turn guidance method, body coordinates of the guided weapon are rotated with respect to inertial coordinates by means of a roll maneuver such that the target LOS rate lies entirely in pitch. By simple trigonometry, the required roll angle is given by the arctangent of the yaw LOS rate divided by the pitch LOS rate. Similarly, by simple geometry, the magnitude of the total LOS rate to be nulled by a maneuver in pitch is given by the square root of the sum of the squares of the pitch LOS rate and the yaw LOS rate.

Two salient features of the guidance steering law of the prior art are the use of the arctangent function 25 to generate the appropriate roll angle based on the ratio of the yaw and pitch LOS rates and the use of the magnitude calculating block 31 to generate the magnitude of the total pitch command. Block 33 restores the sign of the pitch command removed by the calculation of the magnitude. Guidance filtering of measured pitch and yaw LOS rates in blocks 11 and 15 is performed previous to the arctangent function.

The bank-to-turn autopilot of FIG. 1 suffers from the same disadvantages commonly associated with bank-to-turn as previously described. If pitch and yaw LOS rate are present at the same time as a roll attitude error (which can be caused by dynamic lags of the roll autopilot), there is movement in the plane perpendicular to the desired movement. Delaying the pitch fin command until the roll fin command has been fully executed results in an undesirable delay. Furthermore, since guidance filtering is performed in a rolling reference frame, high frequency roll rates cause the servo-dynamic lag of the command loops to be increased. Finally, and most significantly, the use of the arctangent function causes large roll attitude perturbations just prior to impact as a result of noise and glint disturbances while LOS rates are very small.

By nature of the arctangent function with pitch in the denominator, when the pitch LOS rate passes through zero undergoing a change in sign, the ratio of the yaw to pitch rates becomes a very large number first of one sign and then of the other causing the arctangent function to jump between +90° and −90°. Since the autopilot is designed to null LOS rates, the pitch LOS rate is most likely to pass through zero as the guided weapon nears its target, causing the guided weapon to undergo a damaging 180° roll just prior to impact with a corresponding adverse effect on accuracy. The arctangent function therefore has the perverse effect of causing large roll attitude perturbations just when the guided weapon is doing well (zero pitch LOS rate).

Figure 2:
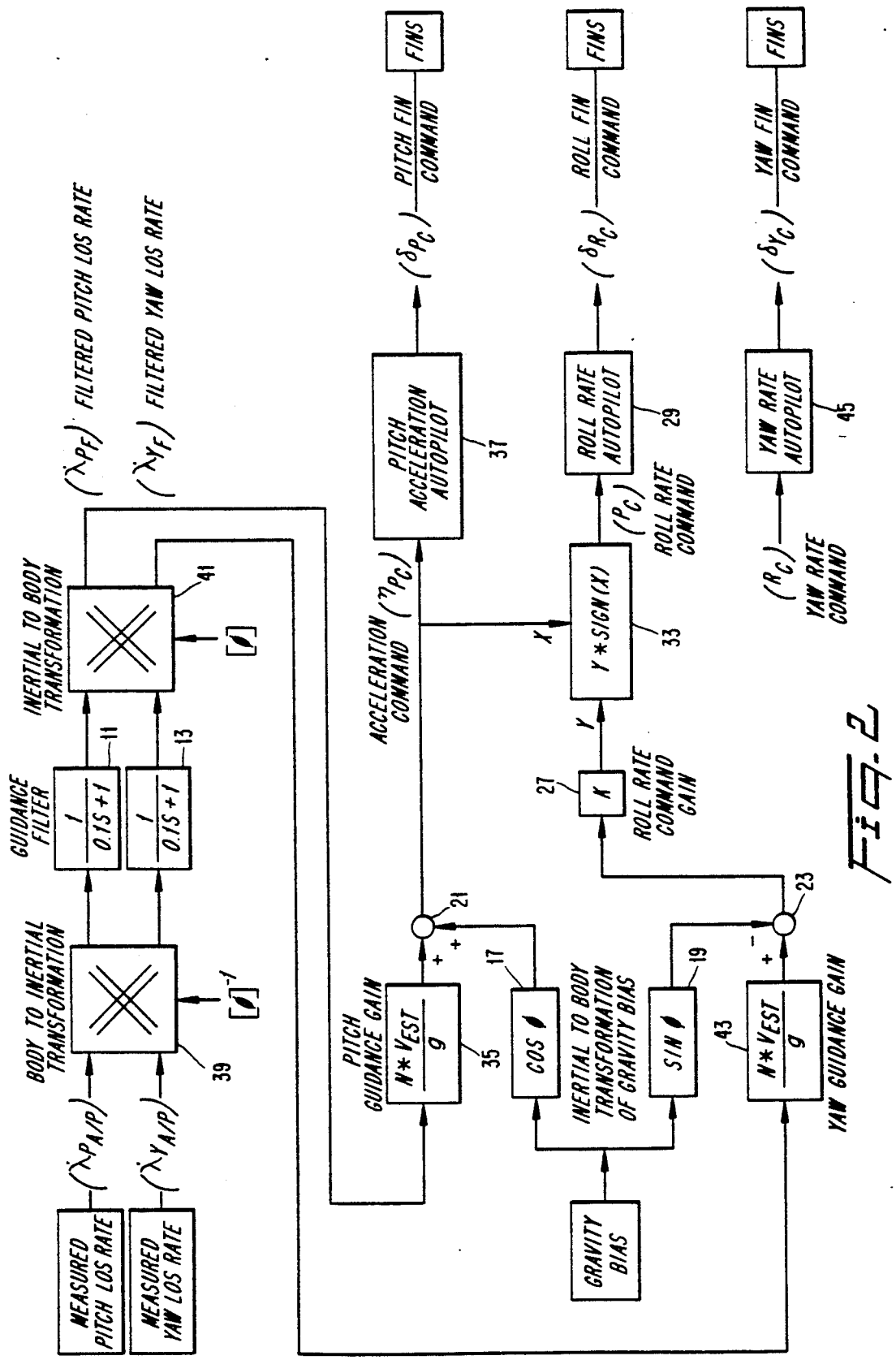
FIG. 2 is a block diagram illustrating the guidance steering law of the present invention.

Referring now to FIG. 2 showing the bank-to-turn autopilot of the present invention, the measured pitch and yaw LOS rates are transformed from body to inertial coordinates in block 39 prior to guidance filtering in blocks 11 and 15 and subsequent transformation back to body coordinates in block 41. The transformation equations used to go to and from an inertial reference frame are well-known to those of ordinary skill in the art. Although guidance filtering is shown as being identically performed as that of FIG. 1, the present invention allows for more optimal filtering as explained below. The resulting LOS rates are then multiplied by respective guidance gain factors in blocks 35 and 43 and gravity biased in similar fashion as in FIG. 1 to arrive at a pitch acceleration command $\eta P_c$ and a roll rate command. The gravity biased pitch acceleration command is applied directly to the pitch acceleration autopilot 37 to arrive at a pitch fin command $\delta P_c$. The gravity biased yaw acceleration command is further multiplied by a roll rate command gain K in block 27 and the sign of the pitch acceleration command in block 33. The resulting roll rate command $P_c$ is then applied to the roll rate autopilot 29 to arrive at a roll fin command $\delta R_c$. In addition, a stabilizing yaw fin is controlled by a yaw rate autopilot 45 to prevent excessive yaw rates from occurring but is not used to maneuver.

The bank-to-turn autopilot of the present invention comprises in large part the same elements shown in FIG. 1 but arranged in a far different fashion to implement a distinctly different control concept. The arctangent function and the magnitude calculations are both avoided, the magnitude of the roll fin command being determined entirely by the yaw LOS rate and the pitch fin command being determined entirely by the pitch LOS rate. In this fashion, when the guided weapon is doing well and the yaw LOS rate is small, changes in roll attitude will be correspondingly small; whereas, when the yaw LOS rate is large indicating that large cross-plane maneuvers are required, fast roll rates are provided. With respect to pitch, the pitch fin command is not coupled with the yaw LOS rate by the sort of magnitude calculation performed in the prior art. Movements in the plane perpendicular to the desired movement caused by roll attitude errors (which can be produced by roll autopilot dynamic lags) are thereby minimized. The sole interaction between the pitch and roll channels is to correct the sign of the roll rate command using the pitch acceleration command (block 33) in order to achieve minimum roll operation. In other words, instead of always assuming a positive pitch maneuver and aligning the positive pitch axis of the body reference frame with the target, the autopilot determines the actual direction of the maneuver and aligns the negative pitch axis of the body reference frame with the target when a negative pitch maneuver is indicated.

In addition, heavier guidance filtering is made possible without incurring the penalty of increased pitch/yaw/roll coupling by performing guidance filtering in a non-rolling reference frame. Body pitch and yaw LOS rates are first transformed to inertial rates (block 39) used by the guidance filters 11 and 15, the filtered rates being subsequently transformed back from an inertial reference frame to a body reference frame (block 41). The transformation equations used to go to and from an inertial reference frame are well known to those of ordinary skill in the art.

Gravity bias is applied to the filtered pitch and yaw LOS rates in essentially the same fashion as in the prior art with the exception that, because of the elimination of the arctangent function, the autopilot of the present invention may be over-gravity biased in order to realize a lofting trajectory that may be more favorable for some types of warheads. More specifically, assurance of detonation, or generation of maximum destructive force, or both, may be greater for some types of warheads when using a lofting trajectory so as to increase impact attitude and velocity and hence force. During the guided portion of such a trajectory the pitch LOS rates transitions from positive through zero to negative. Since the negative pitch command generally occurs upon final approach to the target, correcting the sign of the roll rate command using the pitch acceleration command as in the present invention avoids a damaging 180° roll that would otherwise occur. Using the arctangent approach of the prior art, the damaging 180° roll occurs as the pitch rate passes through zero as previously explained.

The guidance steering law of the present invention achieves anti-tank type accuracies for seekers having large tracking noise ($\sigma = 1°/s$) and glint (0.8 meters at 0 to 5 Hz). Differing gravity biases and corresponding approach geometries can be achieved since the large attitude perturbations associated with near zero line-of-sight rates using the arctangent approach have been avoided. Furthermore, maintaining separation of the pitch and roll channels minimizes movement in the plane perpendicular to the desired direction, and performing guidance filtering in a non-rolling reference frame allows the guidance filter functions to be separately optimized without concern of increasing pitch/yaw/roll coupling.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention as indicated by the appended claims rather than the foregoing description, and all changes which come within the meaning and range of equivalents thereof are intended to be embraced therein.

What is claimed is:

1. A method of controlling a guided weapon comprising the steps of:
    determining a line-of-sight rotation rate between said guided weapon and a target in terms of first body pitch and yaw components relative to a body of said guided weapon;
    transforming said pitch and yaw components into inertial pitch and yaw components relative to an inertial reference frame
    filtering said inertial pitch and yaw components;
    transforming said inertial pitch and yaw components, after said filtering, back into second body pitch and yaw components; and
    commanding a pitch control channel with said second body pitch component and commanding a roll control channel with said second body yaw component.

2. The method of claim 1 wherein the magnitudes of signals in the pitch control channel and the roll control channel are independent of one another.

3. The method of claim 1 wherein the signs of signals in the pitch control channel and the roll control channel are interdependent.

4. The method of claim 3 wherein the sign of a signal in the roll control channel is dependent on the sign of a signal in the pitch control channel.

5. The method of claim 4 further comprising the step of applying a gravity bias to said control channels.

6. The method of claim 5 wherein said gravity bias is roll-resolved so as to be effective in an inertially upward direction regardless of a roll attitude of said guided weapon.

7. A bank-to-turn guided weapon control system comprising:
    line-of-sight rate determining means for determining a line-of-sight rate between said guided weapon and a target;
    a roll command channel; and
    means for coupling only a yaw rate portion of an output of said line-of-sight rate determining means to said roll command channel.

8. The guided weapon control system of claim 7 further comprising:
    line-of-sight rate transformation means connected to said line-of-sight rate determining means for performing a transformation on said line-of-sight rate;
    guidance filter means connected to said line-of-sight rate transformation means for filtering said line-of-sight rate according to a guidance algorithm; and
    line-of-sight rate inverse transformation means connected to said guidance filter means and said means for performing an inverse transformation on said line-of-sight rate.

9. The guided weapon control system of claim 7 further comprising a pitch command channel and wherein said roll command channel includes sign determining means responsive to a sign of a signal in said pitch command channel for controlling the polarity of a signal in said roll command channel.

10. The guided weapon control system of claim 9 further comprising gravity bias means for counteracting gravitational effects on said guided weapon and wherein said roll and pitch command channels each include summing means connected to said gravity bias means for summing a signal from said gravity bias means into a respective one of said channels.

11. The guided weapon control system of claim 10 wherein said gravity bias means is roll resolved so as to be effective in an inertially upward direction regardless of a roll attitude of said guided weapon.

12. The guided weapon of claim 11 wherein said guidance algorithm implements proportional navigational guidance.

13. A bank-to-turn guided weapon, comprising
    a pitch control surface for changing a pitch attitude of said guided weapon;
    a roll control surface for changing a roll attitude of said guided weapon; and
    a bank-to-turn autopilot for changing a yaw attitude of said guided weapon through a combination of changes in said pitch attitude and said roll attitude, said bank-to-turn autopilot comprising yaw rate determining means and pitch rate determining means and a roll command channel, said yaw rate determining means commanding said roll command channel exclusive of any contribution in magnitude from said pitch determining means.

* * * * *